Sept. 16, 1947.  E. G. LOFGREN  2,427,361
ELECTRICAL INDUCTION BOILER
Filed Oct. 9, 1944   3 Sheets-Sheet 2
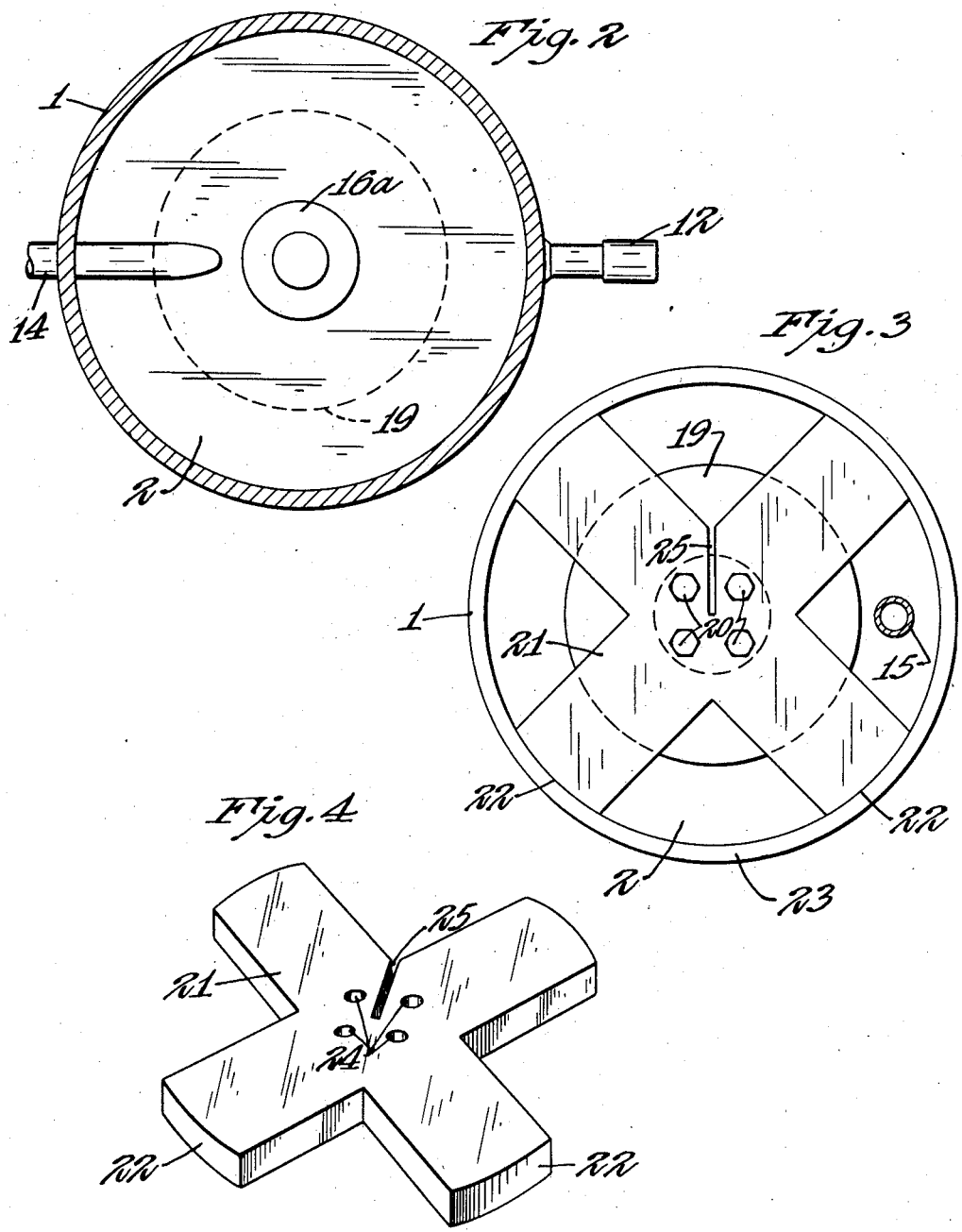

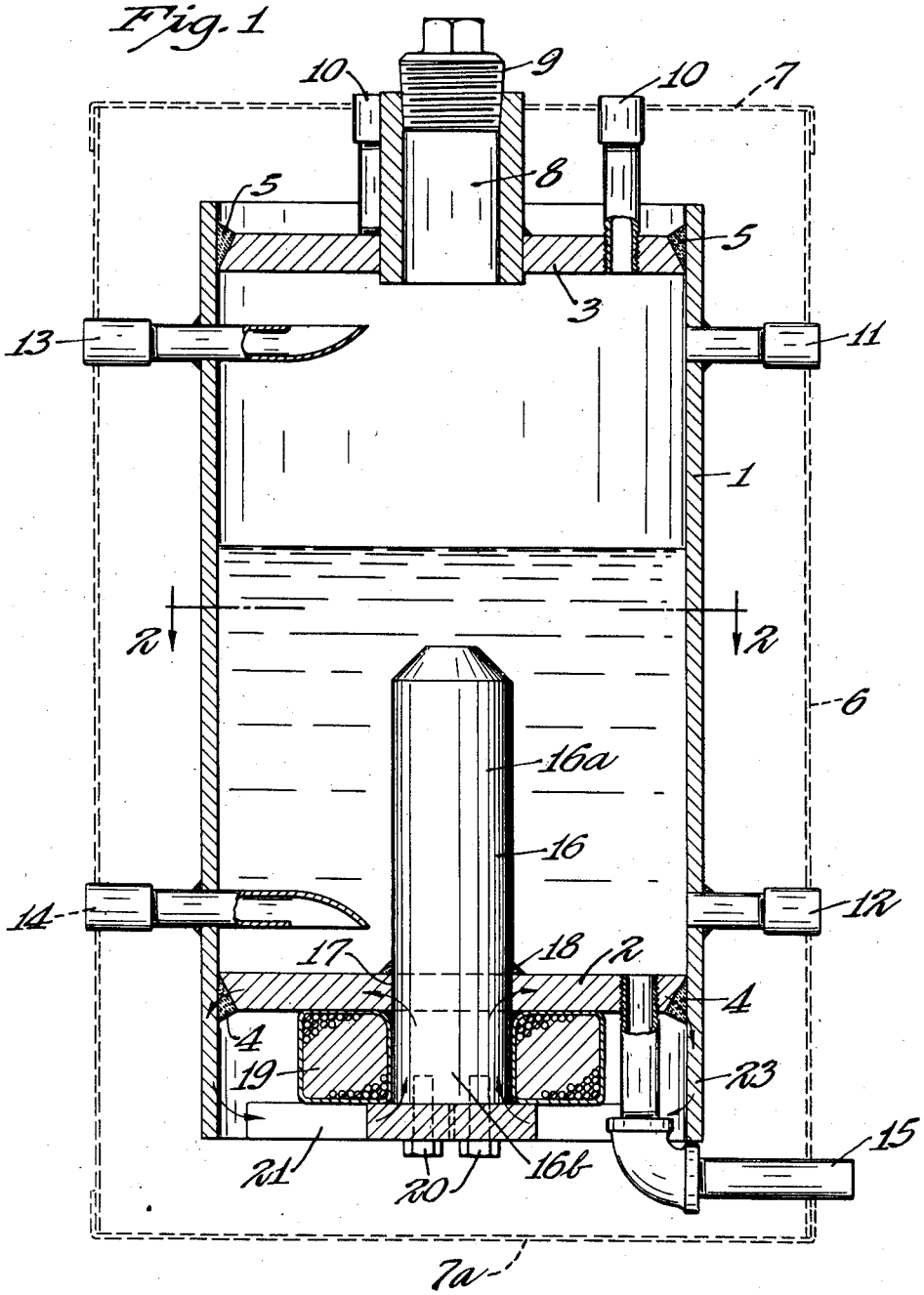

Sept. 16, 1947.   E. G. LOFGREN   2,427,361
ELECTRICAL INDUCTION BOILER
Filed Oct. 9, 1944   3 Sheets-Sheet 3
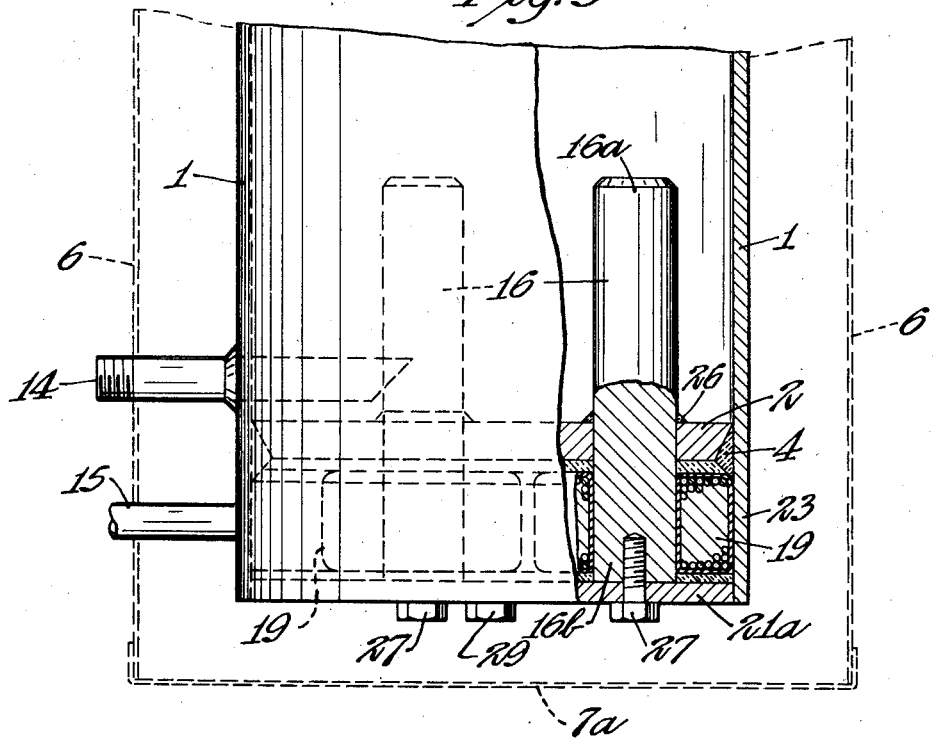
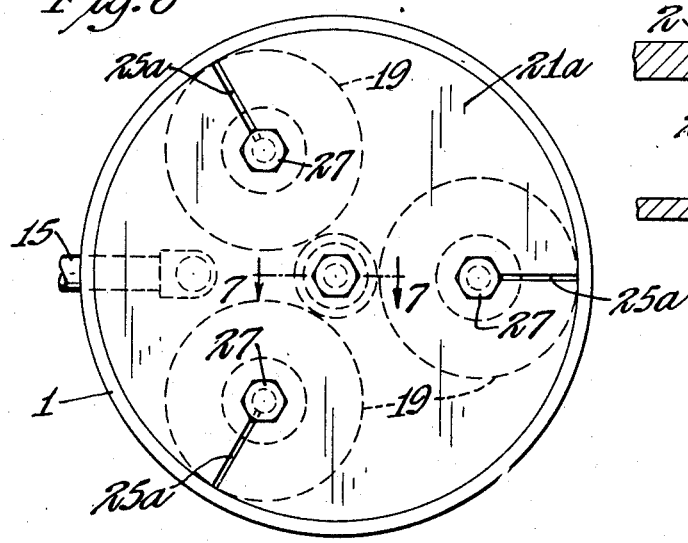
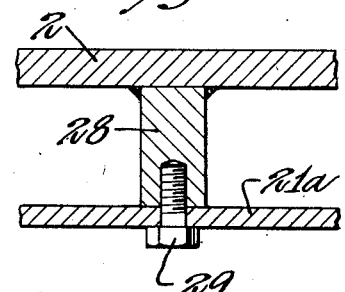
Inventor
Einar G. Lofgren
By Merchant & Merchant
Attorneys Patented Sept. 16, 1947

2,427,361

UNITED STATES PATENT OFFICE 2,427,361

ELECTRICAL INDUCTION BOILER

Einar G. Lofgren, Minneapolis, Minn.

Application October 9, 1944, Serial No. 557,800

3 Claims. (Cl. 219—47)

My present invention relates to and provides a highly efficient electric induction liquid heater or boiler. This improved heater may be designed and used either as a steam boiler or as a hot water heater and may be made in various different sizes. However, the improved heater was especially designed for use as a comparatively small boiler to meet the requirements for garment pressers, tire vulcanizing plants, restaurant steam tables, upholstering, plush and velour cleaning, candy kettles, bakery ovens, glue heaters, wax melting kettles, matrix tables and analogous purposes.

The boiler proper is of simple and comparatively low cost construction, has no flues and is capable of being readily assembled or disassembled for cleaning purposes and repairs.

One of the primary objects of my invention is the provision of a boiler construction in which the electrical elements, the average life of which is not as long as the boiler proper, can be readily replaced without taking the boiler apart and with this object in view I have secured the electrical induction coils to the outside of the base of the boiler in a manner in which they can be readily removed.

A further object of my invention is to provide an electro-magnetic core, the base of which is surrounded by the electric induction coil on the outside surface of the boiler and the nose of which projects upward through a water tight hole in the base of the boiler for a considerable distance.

The above and other objects of my invention will become obvious from the following detailed description and by reference to the attached drawings.

Referring to the drawings in which like characters indicate like parts throughout the several views:

Fig. 1 is a vertical axial section of one of the forms of my novel boiler, some parts being shown in dotted and some parts being shown in full;

Fig. 2 is a horizontal section taken on the line 2—2 of Fig. 1;

Fig. 3 is a bottom plan of the boiler proper, one part being broken away and shown in section;

Fig. 4 is a perspective of the web-like induction anchoring element;

Fig. 5 is a fragmentary of a side elevation of a modified form of my novel boiler, some parts being shown in dotted and some being broken away and shown in section;

Fig. 6 is a bottom plan view of the structure shown in Fig. 5; and

Fig. 7 is a fragmentary sectional view taken on the line 7—7 of Fig. 6.

Referring with more particularity to the drawings, the boiler shell or vessel, as shown, is made up of a metal cylindrical wall 1, a fixed lower head or wall 2, and a fixed upper head or wall 3. Bottom 2, as shown, is securely anchored in the cylindrical wall 1 by welding applied, for example, as shown at 4. Likewise, header plate 3 is welded to cylinder 1 as shown at 5.

This vessel is shown as placed within an outer relatively thin metallic shell 6 having upper and lower caps 7 and 7a, respectively, which are preferably removable. Said shell 6 is so spaced from the vessel as to provide ample space for insulating material such as asbestos, rock wool, or other similar insulating material that is capable of being packed.

The upper head plate or wall 3, as shown in Fig. 1, is provided with a clean-out opening 8 which is closed at its upper end by means of a tapered, screw threaded plug 9. Also, projecting upwardly from the top plate 3 of the vessel and projecting upwardly through shell cap 7 are two nipple equipped openings 10 to which may be attached, boiler attachments such as pressure gauges, safety valves and the like.

Shown as projecting laterally out the side of vessel or boiler 1 and through cylindrical shell 6 are two nipple equipped openings 11 and 12 to which a water level indicator is to be attached. Projecting from the upper end of the opposite side of the boiler is a nipple equipped tubular opening 13, which serves as a steam outlet pipe. Projecting from the lower end of the boiler and, as shown on the same side as steam outlet 13, is a nipple equipped steam or condensate return 14. Shown as projecting from the disc-like bottom wall 2 of the boiler is a drain pipe 15.

In the structure shown in Fig. 1 a cylindrical, elongated electro-magnetic core 16 is shown as projecting through a central opening 17 in the electro-magnetic bottom header or wall 2 which is made water tight by welding or the like, shown by the numeral 18. Magnetic core 16, as shown, thus has a head 16a which projects upwardly for a considerable distance into the water level on the inside of the boiler and a base 16b which projects outwardly from bottom wall 2 for a short distance, both of which purposes will hereinafter become apparent.

Surrounding the outwardly projecting portion 16b of the magnetic core is an induction coil 19, connected to a source of electricity (not shown), and suitably insulated from all adjacent metallic parts.

Secured to the under end of magnetic core 16 by means of screw threaded studs 20 is a retainer plate 21, shown as being in the form of a cross and having its ends 22 in close contact (preferably press fit) with the inside surface of the downwardly projecting skirt 23, so as to provide continuity for the flux path. As shown in Fig. 4, retainer plate 21 is provided with a plurality of holes 24 which are in alignment with the screw threaded holes in the bottom of the magnetic core and through which the screw threaded studs 20 pass, when it is sought to draw the retainer plate 21 tightly up against the base of the core 16 and into tight engagement with the sides of the skirt 23. Retainer plate 21 is shown as notched at 25 for the purpose of minimizing the flow of secondary currents, thereby reducing the amount of heat generated in said plate.

The structure shown in Figs. 5, 6 and 7 differs primarily from that shown in Figs. 1, 2, 3 and 4 in that it utilizes three separate electric coils 19 and three cores 16, circumferentially spaced about the axis of the boiler.

The several cores 16 project through circumferentially spaced water tight openings in the base plate 2 and are welded, or the like, at 26. A disc-like retainer plate 21a is secured to the bottom ends of the three cores 16 by means of threaded studs 27. Said retainer plate 21a is also press fit against the inside wall of the depending skirt 23 so as to complete the circuit for the flux field. Welded or otherwise secured to the central portion of the base plate 2 and projecting outwardly to a distance equal to that of the outwardly projecting end 16b of the core 16 is a fourth anchoring lug 28 which connects to retainer plate 21a by means of a threaded stud 29 and completes the circuit for the three separate flux fields of the circumferentially spaced coils 19.

It will be observed that disc-like retainer plate 21a contains three notches 25a extending from the periphery radially inward to the several anchoring studs 27. The purpose of these notches 25a is similar to the notches 25 in the retainer plate 21 of Fig. 1, to wit: to minimize the flow of secondary currents.

*Operation*

When alternating electric current is run through coil 19 of the structure shown in Fig. 1, the magnetic flux field is indicated by the arrows, to wit: through the base 16b of core 16 outward through electro-magnetic lower wall 2 to the cylindrical wall 1, down skirt 23 and back through retainer plate 21 and outwardly projecting base 16b of core 16. As is well known, the rapid reversing of the magnetic polarity of the alternating current generates heat in all the metal elements in the above described field of flux. A secondary source of heat is caused by the secondary currents which flow through the metallic elements in the above described field of flux. The combined sources of heat have been found to be adequate to heat boilers for the purposes above described.

However, where a quicker heating boiler is desired, the structure illustrated in Fig. 5, utilizing a plurality of magnetic coils and cores may be used. The path of flux is substantially the same as the structure shown in Fig. 5, to wit: From the base 16b of core 16 outward through the electro-magnetic base plate 2 to wall 1, down skirt 23 to retainer plate 21a and hence back to element 16b. Toward the inside the path is substantially the same, to wit: From a downwardly projecting base portion 16b of core 16 inwardly through base plate 2 to the central anchoring lug 28 and back again through retainer plate 21a to core 16.

What I claim is:

1. In a liquid heater, a vessel adapted to contain a body of liquid, an electro-magnetic core piece projecting inwardly through a wall of the vessel and anchored thereto in a manner to provide a fluid tight seal therebetween and the wall of the vessel, a portion of the core piece projecting outwardly of the vessel and a portion thereof projecting inwardly of the vessel wall and being directly exposed to fluid in the vessel, and an induction coil mounted on the outwardly projecting portion of the core piece outside of the vessel.

2. In a liquid heater, a vessel adapted to contain a body of liquid to be heated, said vessel having an electro-magnetic wall portion provided with an outwardly projecting electro-magnetic core piece, an induction coil mounted on the outwardly projecting core piece and located wholly outside of the vessel, and an electro-magnetic coil retainer plate detachably mounted on the outer end portion of the outwardly projecting core piece and being in electro-magnetic engagement with the electro-magnetic wall portion of the vessel, whereby to retain the coil in position and to complete a flux path comprising said outwardly projecting core piece, said electro-magnetic wall portion and said coil retainer plate.

3. The structure defined in claim 2 in which the said electro-magnetic wall portion of the vessel is also provided with an electro-magnetic projection extending inwardly of the vessel wall and which is concentrically disposed with respect to the outwardly extending core piece and operates as an extension thereof.

EINAR G. LOFGREN.

REFERENCES CITED

The following references are of record in the file of this patent:

UNITED STATES PATENTS

| Number | Name | Date |
| --- | --- | --- |
| 932,242 | Berry | Aug. 24, 1909 |
| 1,193,404 | Ludwick | Aug. 1, 1916 |
| 1,564,612 | Mott | Dec. 8, 1925 |
| 1,854,322 | White | Apr. 19, 1932 |
| 1,918,637 | Fendt et al. | July 18, 1933 |
| 2,227,866 | Somes | Jan. 7, 1941 |